(12) United States Patent
Ando et al.

(10) Patent No.: US 9,762,874 B2
(45) Date of Patent: Sep. 12, 2017

(54) IMAGING APPARATUS COMPRISING IMAGE SENSOR AND SIGNAL PROCESSING CIRCUIT (71) Applicant: Panasonic Intellectual Property Management Co., Ltd., Osaka (JP)

(72) Inventors: Takamasa Ando, Osaka (JP); Tsuguhiro Korenaga, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/977,322

(22) Filed: Dec. 21, 2015

(65) Prior Publication Data

US 2016/0205373 A1    Jul. 14, 2016

(30) Foreign Application Priority Data

Jan. 8, 2015   (JP) .................... 2015-002553

(51) Int. Cl.
| H04N 9/65 | (2006.01) |
| H04N 9/64 | (2006.01) |
| H04N 5/33 | (2006.01) |
| H04N 9/04 | (2006.01) |
| H04N 5/232 | (2006.01) |

(52) U.S. Cl.
CPC .............. *H04N 9/64* (2013.01); *H04N 5/332* (2013.01); *H04N 5/23232* (2013.01); *H04N 9/045* (2013.01)

(58) Field of Classification Search
None
See application file for complete search history.

(56) References Cited

U.S. PATENT DOCUMENTS

| 2006/0038705 | A1 | 2/2006 | Brady et al. | |
| 2009/0027518 | A1 | 1/2009 | Kita | |
| 2009/0244355 | A1 | 10/2009 | Horie | |
| 2013/0229646 | A1 | 9/2013 | Sakurai | |
| 2014/0163391 | A1 | 6/2014 | Koizumi et al. | |
| 2014/0297703 | A1* | 10/2014 | Goldstein | H04N 19/90 708/201 |
| 2015/0029503 | A1* | 1/2015 | McMackin | G01J 3/18 356/300 |
| 2015/0215529 | A1* | 7/2015 | Wang | G06T 5/007 348/218.1 |

FOREIGN PATENT DOCUMENTS

| JP | 2007-108124 | 4/2007 |
| WO | 2007/046280 | 4/2007 |
| WO | 2013/002350 | 1/2013 |

* cited by examiner

*Primary Examiner* — James Hannett
(74) *Attorney, Agent, or Firm* — McDermott Will & Emery LLP (57) ABSTRACT

An imaging apparatus according to an aspect of the present disclosure includes an image sensor which, in operation, acquires m kinds (m is an integer which is 1 or larger) of light, the m kinds of light each having wavelength characteristic different from each other and outputs one or more signals each corresponding to each of the m kinds of light, and a signal processing circuit which, in operation, processes the one or more signals to generate and output n, which is larger than m, pieces of images corresponding to respective wavelength regions different from each other.

17 Claims, 7 Drawing Sheets

IMAGING APPARATUS COMPRISING IMAGE SENSOR AND SIGNAL PROCESSING CIRCUIT

BACKGROUND

1. Technical Field

The present disclosure relates to an imaging apparatus for acquiring a spectral image.

2. Description of the Related Art

A detailed physical characteristic, which has not been able to be figured out in a conventional RGB image, of an observed object can be figured out by utilizing spectrum information of a large number of bands (for example, dozens of or more bands) each of which is a narrow band. A camera which acquires this multi-wavelength information is called a "hyper spectrum camera". Hyper spectrum cameras are utilized in various fields such as food inspection, biological examination, drug development, and component analysis of minerals.

As an application example of an image which is acquired while limiting a wavelength of an observed object to a narrow band, International Publication Ser. No. 13/002,350 discloses an apparatus which discriminates a tumor part from a non-tumor part of a subject. This apparatus detects that protoporphyrin IX which is accumulated in a cancer cell emits fluorescence of 635 nm and photo-protoporphyrin emits fluorescence of 675 nm, through irradiation of excitation light. Thus, a tumor part and a non-tumor part are discriminated from each other.

Japanese Unexamined Patent Application Publication No. 2007-108124 discloses a method for determining freshness, which is degraded with time, of a perishable food by acquiring information of reflectance characteristics of successive multi-wavelength light.

Systems of a hyper spectrum camera which is capable of measuring a multi-wavelength image or reflectance include a system utilizing compressive sensing as disclosed in a specification of U.S. Pat. No. 7,283,231, for example. An apparatus which is disclosed in the specification of U.S. Pat. No. 7,283,231 disperses light from a measurement object by a first spectral element such as a prism, then marks the light by an encoding mask, and further returns a path of a light beam by a second spectral element. Accordingly, an image which is encoded and multiplexed about a wavelength axis is acquired by a sensor. A plurality of sheets of multi-wavelength images can be reconstructed from the multiplexed image through application of compressive sensing.

Compressive sensing is a technique for reproducing more volume of data than acquired data from the acquired data of few numbers of samples. When a two-dimensional coordinate of a measurement object is (x,y) and a wavelength is denoted as $\lambda$, data f desired to be obtained is three-dimensional data of x, y, and $\lambda$. On the other hand, image data g which is obtained by a sensor is two-dimensional data which is compressed and multiplexed in a $\lambda$ axis direction. Such problem that data f data volume of which is relatively larger is obtained from an acquired image g data volume of which is relatively smaller is so-called defectively-set problem and it is impossible to solve this problem in this state. However, data of a natural image generally have redundancy and this defectively-set problem can be converted into a well-set problem by taking advantage of the redundancy. Examples of a technique for reducing data volume by utilizing redundancy of an image include jpeg compression. In jpeg compression, such method is used that image information is converted into frequency components and a non-essential part of data such as a component of low visual recognition is eliminated. In compressive sensing, such technique is incorporated into arithmetic processing and a data space desired to be obtained is converted into a space which is expressed by redundancy so as to delete an unknown and obtain a solution. As this conversion, discrete cosine transform (DCT), wavelet transform, Fourier transform, total variation (TV), and the like, for example, are used.

SUMMARY

In one general aspect, the techniques disclosed here feature an imaging apparatus including an image sensor which, in operation, acquires m kinds (m is an integer which is 1 or larger) of light, the m kinds of light each having wavelength characteristic different from each other and outputs one or more signals each corresponding to each of the m kinds of light, and a signal processing circuit which, in operation, processes the signal to generate and output n pieces, which is larger than m, of images corresponding to respective wavelength regions different from each other.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Findings which are obtained by the present inventor are described before providing description of embodiments of the present disclosure.

According to the study of the present inventor, a spectral element such as a prism is inserted on a light path in the configuration utilizing the conventional compressive sensing mentioned above. The prism separates light while changing a path of the light for every wavelength by using inflection. Consequently, coma aberration is generated and resolution is degraded disadvantageously.

The present inventor found the above-mentioned problems and studied the configuration for solving these problems.

The present disclosure includes an imaging apparatus described in the following items.

[Item 1]

An imaging apparatus including an image sensor which, in operation, acquires m kinds (m is an integer which is 1 or larger) of light, the m kinds of light each having wavelength characteristic different from each other and outputs one or more signals each corresponding to each of the m kinds of light, and a signal processing circuit which, in operation, processes the one or more signals to generate and output n pieces, which is larger than m, of images corresponding to respective wavelength regions different from each other.

[Item 2]

The imaging apparatus according to Item 1 further including an encoding device which, in operation, changes an intensity of incident light incident on an object or an intensity of reflected light from the object by m kinds by wavelength characteristics which are different from each other, in which the m kinds of light are generated via the encoding device.

[Item 3]

An imaging apparatus including an encoding device which, in operation, changes an intensity of incident light incident on an object or an intensity of reflected light from the object by m kinds (m is an integer which is 1 or larger) by wavelength characteristics which are different from each other, an image sensor which, in operation, acquires light produced when the incident light reflects on the object or the reflected light from the object and outputs a signal corresponding to the light or the reflected light, and a signal processing circuit which, in operation, processes the signal to generate and output n pieces, n being larger than m, of images, the n pieces of images corresponding to respective wavelength regions which are different from each other.

[Item 4]

An imaging apparatus including an encoding device which, in operation, changes an intensity of incident light incident on an object or an intensity of reflected light from the object by wavelength characteristics which are different from each other for respective photographing to encode light in respective times of photographing, an image sensor which, in operation, acquires the light which is encoded by the encoding device and outputs a signal corresponding to the light, and a signal processing circuit which, in operation, processes m signals, m being an integer which is 1 or larger, outputted from the image sensor in m times of photographing to generate n pieces, n being larger than m, of images, the n pieces of images corresponding to respective wavelength regions which are different from each other.

[Item 5]

The imaging apparatus according to any one of Items 1 to 4, in which the wavelength characteristic has one or more local maximum values of a transmittance in each of a first wavelength region and a second wavelength region, the first wavelength region and the second wavelength region being different from each other, and each of the one or more local maximum values in each of the first wavelength region and the second wavelength region is 0.5 or larger where the wavelength characteristic is normalized so that a maximum value of the transmittance is 1 and a minimum value is 0.

[Item 6]

The imaging apparatus according to any one of Items 1 to 5, in which the wavelength characteristic is even in a spatial direction.

[Item 7]

The imaging apparatus according to any one of Items 2 to 6, in which the encoding device includes spectral filters of which wavelength distributions of transmittances are different from each other, and a switch which, in operation, switches among the spectral filters to dispose one of the spectral filters on a light path of the imaging device for every photographing.

[Item 8]

The imaging apparatus according to Item 7, in which the n pieces of images include a first image and a second image, and a column vector, elements of which are respective transmittances of the spectral filters in the first wavelength region corresponding to the first image is independent from a column vector, elements of which are respective transmittances of the spectral filters in the second wavelength region which is different from the first wavelength region and corresponds to the second image.

[Item 9]

The imaging apparatus according to any one of Items 2 to 6, in which the encoding device includes light sources of which wavelength distributions of light intensities are different from each other, and the m kinds of light are obtained by changing a combination of a light source which is turned on and a light source which is turned off among the light sources.

[Item 10]

The imaging apparatus according to Item 9, in which the n pieces of images include a first image and a second image, and a column vector, elements of which are values of intensities of the m kinds of light in a first wavelength region corresponding to the first image is independent from a column vector, elements of which are values of intensities of the m kinds of light in a second wavelength region which is different from the first wavelength region and corresponds to the second image.

[Item 11]

The imaging apparatus according to any one of Items 1 to 10, in which m has a value which is one-fifth of n or smaller.

[Item 12]

The imaging apparatus according to any one of Items 1 to 11, in which the image sensor includes Cn kinds of color filters, and m, n, and Cn satisfy a relation of m×Cn<n.

[Item 13]

The imaging apparatus according to any one of Items 1 to 12, in which the imaging apparatus is configured such that an auto-correlation function y(i,j) which is defined by a following formula and expresses a correlation value between a first wavelength characteristic in a wavelength region of an N-th image, among the n pieces of images, of an M-th kind of light among the m kinds of light and a second wavelength characteristic in a wavelength region of an N+j-th image, among the n pieces of images, of an M+i-th kind of light among the m kinds of light, by expressing i and j as variables has a local maximum value only on y(0,0).

$$y(i, j) = \sum_{M=1}^{m} \sum_{N=1}^{n} x(M, N) \cdot x(M + i, N + j)$$ [Formula 1]

where, x(M,N) denotes the first wavelength characteristic, x(M+i,N+j) denotes the second wavelength characteristic, i=−(m−1), . . . , −1, 0, 1, . . . , (m−1), and j=−(n−1), . . . , −1, 0, 1, . . . , (n−1) in the above formula.

[Item 14]

The imaging apparatus any one of Items 1 to 13, in which m has a value of one-tenth of n or smaller.

More specific embodiments of the present disclosure will be described below with reference to the accompanying drawings. In the following description, signals indicating an image, that is, gathering of signals indicating pixel values of respective pixels is sometimes referred to merely as an "image". In the following description, an xyz coordinate shown in the drawings is used.

First Embodiment

[1. Imaging Apparatus]

The configuration of an imaging apparatus D1 according to an embodiment is first described with reference to FIG. 1 to FIG. 4B.

Figure 1:
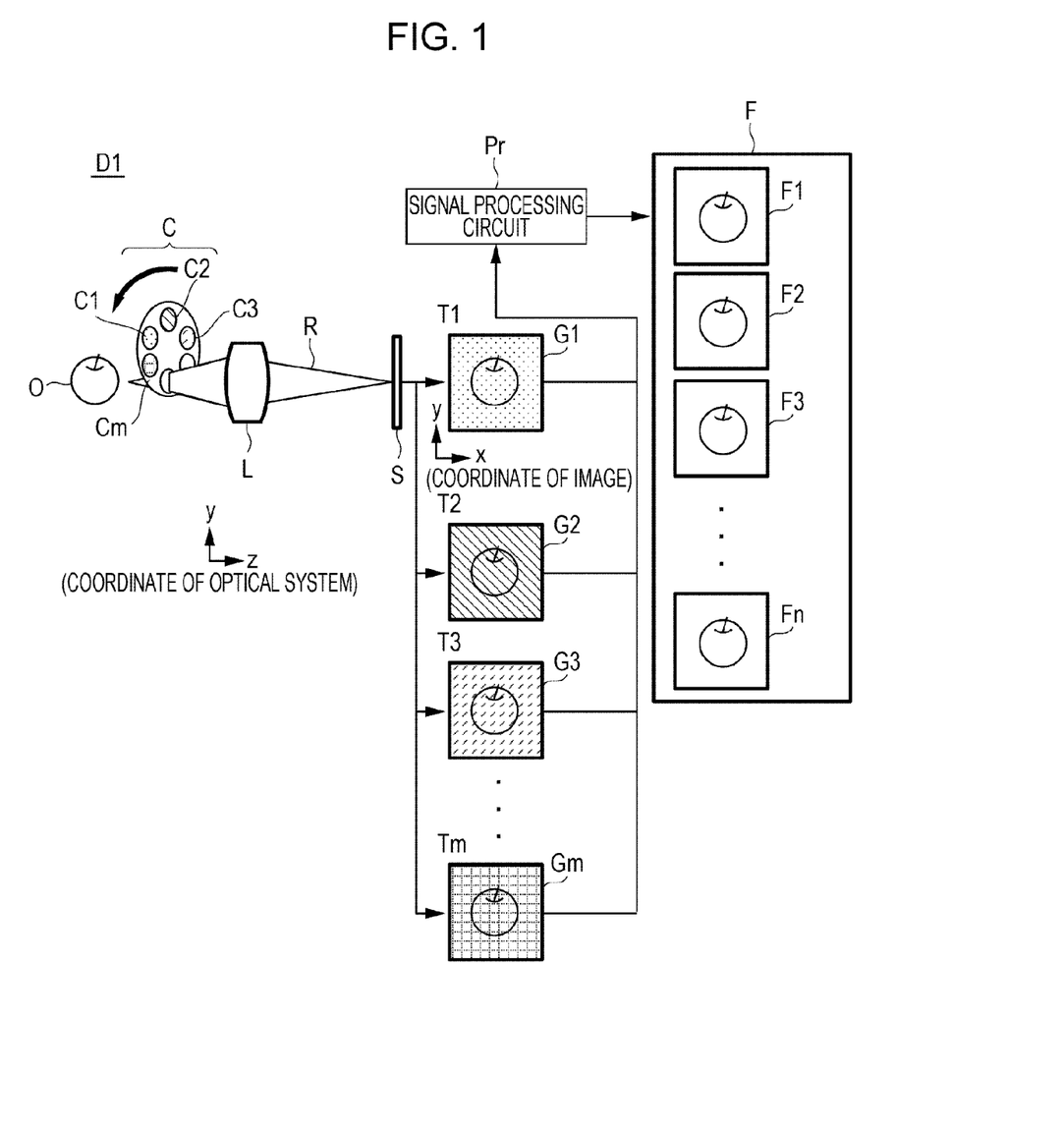
FIG. 1 is a schematic view illustrating an imaging apparatus D1 according to a first embodiment of the present disclosure.

FIG. 1 is a schematic view illustrating the imaging apparatus D1 according to a first embodiment. The imaging apparatus D1 of the present embodiment includes an image forming optical system L, an encoding device C, and an image sensor S.

[1-1. Image Forming Optical System L]

The image forming optical system L includes at least one imaging lens. One lens is illustrated in FIG. 1. The image forming optical system L may be composed of a combination of a plurality of lenses. The image forming optical system L condenses light coming from a photographing object O so as to form an image on an imaging plane of the image sensor S.

[1-2. Encoding Device C]

The encoding device C is disposed between the photographing object O and the image sensor S. The encoding device C is disposed between the photographing object O and the image forming optical system L in an example of FIG. 1, but the configuration is not limited to this example. That is, the encoding device C may be disposed between the image forming optical system L and the image sensor S. In a case where the encoding device C is disposed between the photographing object O and the image forming optical system L, the imaging apparatus D1 can be more reduced in size as the encoding device C is disposed closer to the image forming optical system L. The encoding device C modulates an intensity of reflected light from the photographing object O at random for every wavelength region and every photographing and outputs the modulated light. This process by the encoding device C in the first embodiment is referred to as "encoding" in this specification. "Random" will be described later.

The encoding device C includes m pieces of encoding elements C1, C2, C3, . . . , and Cm which have spectral transmittances different from each other. The encoding device C further includes a switch which is a mechanism for switching the m pieces of encoding elements C1 to Cm. Specifically, the encoding device C has a rotation axis in the example of FIG. 1. The m pieces of encoding elements C1 to Cm are arranged at equal distances from the rotation axis. When the encoding device C rotates, an encoding element which is disposed on a path of light which reaches the image sensor S is switched. In other words, one of the m pieces of encoding elements is disposed on the path of light which reaches the image sensor S in one photographing. Further, other m−1 pieces of encoding elements are disposed outside the path in this photographing.

The mechanism for switching the encoding elements C1 to Cm is not limited to the above-described example. For example, a group of encoding elements which are aligned may be moved in an aligning direction for switching in every photographing.

In the present embodiment, encoding elements which have different spectral transmittances from each other are switched in every photographing so as to encode reflected light from a photographing object by a different wavelength characteristics in respective photographing.

The encoding element is composed of a spectral filter in the first embodiment. Respective encoding elements C1, C2, C3, . . . , and Cm are made of translucent members and have spectral transmittances different from each other. "Spectral transmittances" represent a wavelength distribution of light transmittances. The spectral transmittance of the encoding element is even in a spatial direction.

Figure 2A:
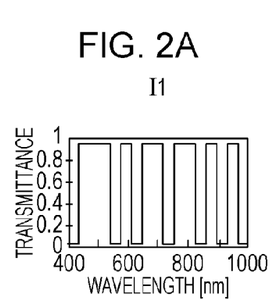
FIG. 2A illustrates an example of a spectral transmittance in an encoding element C1 according to the first embodiment.
Figure 2B:
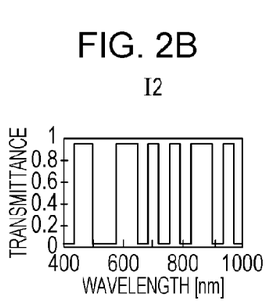
FIG. 2B illustrates an example of a spectral transmittance in an encoding element C2 according to the first embodiment.
Figure 2C:
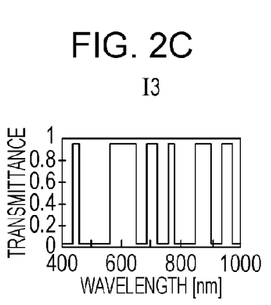
FIG. 2C illustrates an example of a spectral transmittance in an encoding element C3 according to the first embodiment.
Figure 2D:
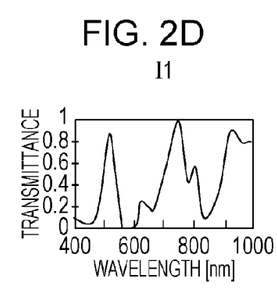
FIG. 2D illustrates another example of the spectral transmittance in the encoding element C1 according to the first embodiment.
Figure 2E:
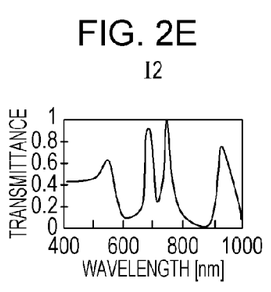
FIG. 2E illustrates another example of the spectral transmittance in the encoding element C2 according to the first embodiment.
Figure 2F:
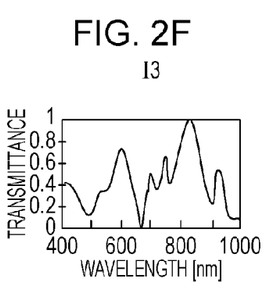
FIG. 2F illustrates another example of the spectral transmittance in the encoding element C3 according to the first embodiment.

FIG. 2A and FIG. 2D illustrate examples of a spectral transmittance l1 of the encoding element C1. FIG. 2B and FIG. 2E illustrate examples of a spectral transmittance l2 of the encoding element C2. FIG. 2C and FIG. 2F illustrate examples of a spectral transmittance l3 of the encoding element C3. FIG. 2A to FIG. 2C illustrate binary-scale transmittance distributions in which a transmittance has either one of approximately 0 or approximately 1. Approximately 0 indicates a value which is 20% or smaller, and approximately 1 indicates a value which is 80% or larger. The spectral transmittances l1, l2, and l3 are different from each other. Specifically, wavelength bands in which the transmittance becomes approximately 0 or approximately 1 are different from each other. It is not necessary to set the transmittance distribution in the binary scale. For example, the grayscale in which a transmittance has an arbitrary value which is from 0 to 1 inclusive may be employed as illustrated in FIG. 2D to FIG. 2F.

Figure 3A:
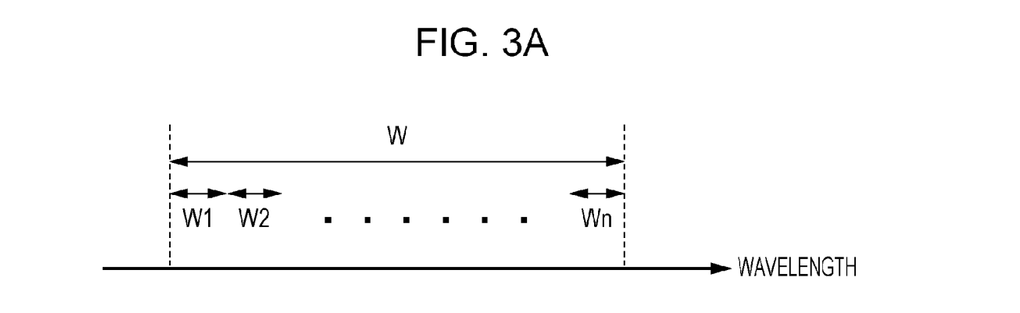
FIG. 3A illustrates an example of a relation between an object wavelength region W and a plurality of wavelength regions W1, W2, . . . , and Wn which are included in the object wavelength region W.
Figure 3B:
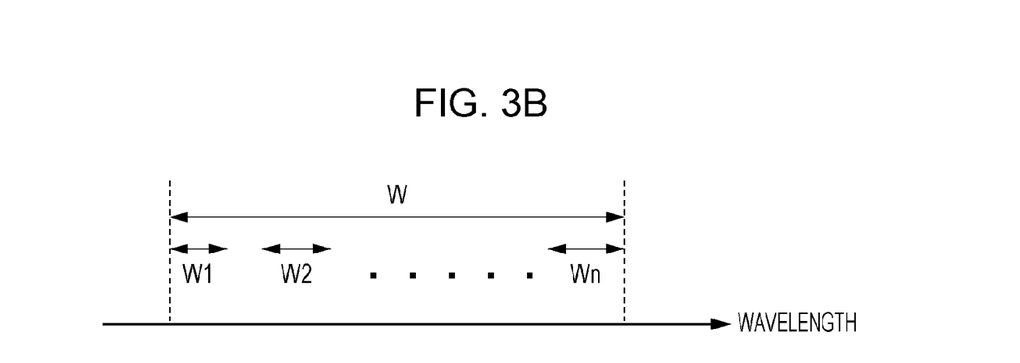
FIG. 3B illustrates another example of a relation between the object wavelength region W and a plurality of wavelength regions W1, W2, . . . , and Wn which are included in the object wavelength region W.

FIG. 3A and FIG. 3B illustrate a relation between an object wavelength region W and a plurality of wavelength regions W1, W2, . . . , and Wn which are included in the object wavelength region W. The wavelength regions W1 to Wn are wavelength regions which are used for an image by the imaging apparatus D1. Further, a signal processing circuit Pr, which will be described later, reconstructs n pieces of spectral images F1 to Fn which are separated for respective wavelength regions W1 to Wn.

The object wavelength region W can be set in various ranges depending on use. The object wavelength region W can be a wavelength region of visible light (approximately 400 nm to 700 nm), a wavelength region of near infrared rays (approximately 700 nm to 2500 nm), a wavelength region of near ultra-violet rays (approximately 10 nm to 400 nm), a wavelength region of middle infrared, a wavelength region of far infrared, or a radio wave region of a terahertz wave, a millimeter wave, and the like, for example. Thus, a wavelength region which is used in the imaging apparatus D1 is not limited to a visible light region. Not only visible light, but also invisible light such as near ultra-violet rays, near infrared rays, and a radio wave is also referred to as "light" for the sake of simplicity, in this specification.

In the present embodiment, respective divided wavelength regions which are obtained by dividing the object wavelength region W equally by n, where n is an arbitrary integer which is 4 or larger, are wavelength regions W1, W2, . . . , and Wn, as illustrated in FIG. 3A. However, wavelength regions are not limited to such example. A plurality of wavelength regions which are included in the object wavelength region W may be arbitrarily set. For example, the widths (bandwidths) may be set uneven depending on wavelength regions as illustrated in FIG. 3B. Further, a gap may be provided between adjacent wavelength regions.

Figure 4A:
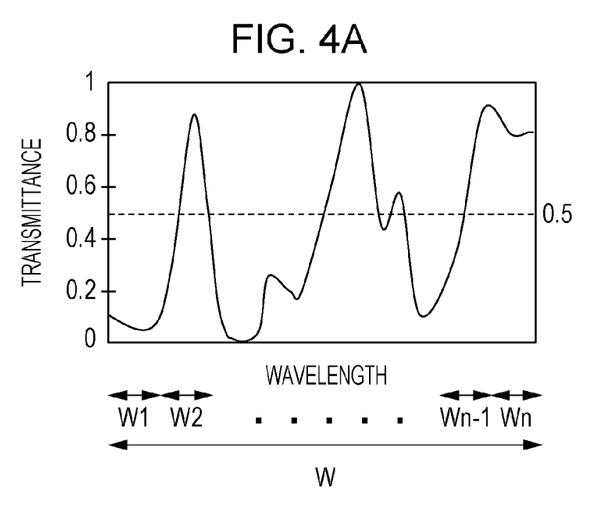
FIG. 4A illustrates an example of a spectral transmittance of an encoding element according to the first embodiment.
Figure 4B:
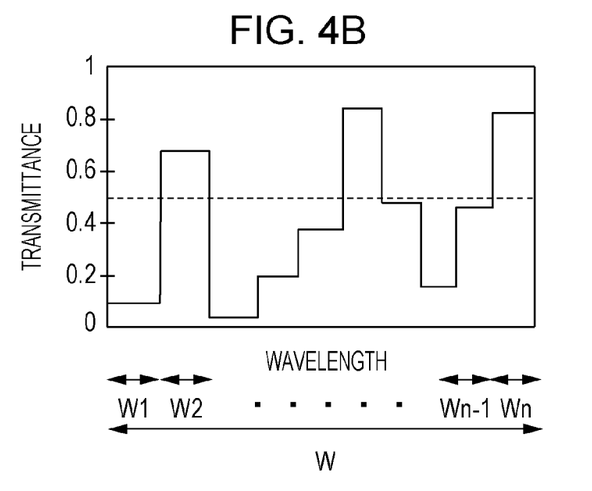
FIG. 4B illustrates another example of a spectral transmittance of the encoding element according to the first embodiment.

FIG. 4A and FIG. 4B illustrate a characteristic of a spectral transmittance of an encoding element. FIG. 4A illustrates an example of a spectral transmittance of the grayscale and FIG. 4B illustrates an example of a spectral transmittance of the binary scale. The wavelength distribution, which is illustrated in FIG. 4A, of light transmittances is normalized so that the maximum value of light transmittances within the object wavelength region W is 1 and the minimum value is 0. In this embodiment, one encoding element has a spectral transmittance which is 50% or larger in at least two wavelength regions among the wavelength regions W1 to Wn. In other words, when light which has an even intensity distribution in the object wavelength region W is incident on an encoding element, an intensity, which is normalized by the maximum intensity in the object wavelength region W, (this is defined as a "normalized intensity" in this embodiment) of light outputted from the encoding element is 0.5 or larger in these at least two wavelength regions. Spectral transmittances in the examples of FIG. 4A and FIG. 4B are 50% or larger in the wavelength regions W2, Wn, and the like in the object wavelength region W. The encoding elements C1 to Cm have characteristics of spectral transmittances different from each other. Specifically, combinations or the numbers of wavelength regions, in which transmittances are 50% or larger, are different from each other in the encoding elements C1 to Cm. More specifically, column vectors elements of which are values of transmittances of respective encoding elements C1 to Cm are mutually independent among arbitrary wavelength regions in each of the wavelength regions W1 to Wn. Column vectors may be independent in all combinations of wavelength regions among the wavelength regions W1 to Wn. Further, column vectors may be independent in part of wavelength regions among the wavelength regions W1 to Wn. In this embodiment, a state that the column vectors of respective wavelength regions have independency is equivalent to "random".

Random may be defined by an auto-correlation function which is defined by Formula 2 below.

$$y(i, j) = \sum_{M=1}^{m} \sum_{N=1}^{n} x(M, N) \cdot x(M+i, N+j) \quad \text{[Formula 2]}$$

When the image sensor S acquires m kinds of light which have wavelength characteristics different from each other and the signal processing circuit Pr outputs n pieces of images for respective wavelength regions different from each other, $x(M,N)$ represents a light transmittance of the N-th wavelength region of the M-th kind of light. Further, $i=-(m-1), \ldots, -1, 0, 1, \ldots, (m-1)$ and $j=-(n-1), \ldots, -1, 0, 1, \ldots, (n-1)$ hold. When $M<1$, $N<1$, $M>m$, and $N>n$, $x(M,N)=0$ holds. An auto-correlation function $y(i,j)$ expressed by Formula 2 above is a function by which a correlation value between a light transmittance $x(M,N)$ in the N-th wavelength region of the M-th kind of light and a light transmittance $x(M+i,N+j)$ in the N+j-th wavelength region of the M+i-th kind of light is expressed while expressing i and j as variables. Here, "random" in the present disclosure represents that the auto-correlation function $y(i,j)$ expressed by Formula 2 above has a local maximum value on $y(0,0)$ and does not have a local maximum value on other coordinates. Specifically, the auto-correlation function $y(i,j)$ monotonously decreases from $i=0$ toward $m-1$ and $-(m-1)$ and the auto-correlation function $y(i,j)$ monotonously decreases from $j=0$ toward $n-1$ and $-(n-1)$. Further, in "random", there may be local maximum values on m/10 or smaller points in the i-axis direction and n/10 or smaller points in the j-axis direction, other than $y(0,0)$.

As mentioned above, transmittances of the encoding elements C1 to Cm are 50% or larger in at least two wavelength regions among the wavelength regions W1 to Wn. Meanwhile, as mentioned below, the signal processing circuit Pr generates n pieces of spectral images (sometimes referred to below as "spectrally-separated images") F1 to Fn which are separated from each other for respective wavelength regions W1 to Wn. Accordingly, the encoding elements C1 to Cm superposes and outputs beams of light of at least two wavelength regions among the wavelength regions W1 to Wn which are to be separated from each other. The image sensor S receives the superposed light from the encoding elements C1 to Cm. This represents that the image sensor S acquires data compressed in the wavelength direction.

Resolving power of a spectral transmittance in the wavelength direction, in other words, a half-value width on a part between two local minimum values which sandwich one extreme value (peak) in a spectral transmittance curve can be set approximately a width (bandwidth) of a desired wavelength region. In this case, when a spectral transmittance is resolved into frequency components by using Fourier transform or the like, a value of a frequency component corresponding to the width of the wavelength region is relatively large.

The encoding element can be composed by using at least one selected from the group of a multilayer film, an organic material, a diffraction grating structure, and a fine structure containing metal. In a case of a multilayer film, a dielectric multilayer film or a multilayer film containing a metal layer can be used, for example. When at least one selected from the group of a thickness, a material, and a layering order of each multilayer film differs, a different spectral characteristic can be realized. By using a multilayer film, sharp rise and fall in a spectral transmittance can be realized. In the configuration using an organic material, different spectral characteristics can be realized when a contained pigment or a contained dye is varied or when different kinds of materials are layered. In the configuration using the diffraction grating structure, different spectral characteristics can be realized by providing the diffraction structure having a different diffraction pitch or depth. In a case of the use of the fine structure containing metal, different spectral characteristics can be produced by utilizing spectral dispersion by plasmon effect.

An encoding process by the encoding element can be said a process for performing marking for discriminating images produced by light of respective wavelengths. As long as such marking is possible, distribution of transmittances may be arbitrarily set. A ratio between a region in which the transmittance is 50% or larger in the wavelength region W and a region in which the transmittance is smaller than 50% may be 1:1 or 1:9 which has a bias on one side, for example.

Information on transmittance distribution of the encoding element is acquired in advance by design data or actual measurement calibration and utilized in arithmetic processing which will be described later.

[1-3. Image Sensor]

The image sensor S is a monochromatic type image sensor which has a plurality of light detection cells (referred to also as "pixels" in this specification) which are arranged two-dimensionally. The image sensor S can be a charge-coupled device (CCD) or complementary metal oxide semiconductor (CMOS) sensor, an infrared array sensor, a terahertz array sensor, or a millimeter wave array sensor, for example. The light detection cell can be composed of a photodiode, for example. The image sensor S does not always have to be a monochromatic type image sensor. For example, a color type image sensor which has a filter of R/G/B, R/G/B/IR, or R/G/B/W may be used. The use of a color type image sensor enables increase of a volume of information about a wavelength and enhancement in a degree of precision of reconstruction of the spectrally-separated images F. For example, when the image sensor S has Cn kinds of color filters, the number n of spectrally-separated images F can be increased more than m×Cn pieces. However, in a case where a color type image sensor is used, a volume of information in the spatial direction (x,y direction) is lowered. That is, a volume of information about a wavelength and resolution are in a trade-off relation. A wavelength range of an acquisition object (object wavelength region) may be arbitrarily determined. A wavelength range is not limited to a visible wavelength range but may be a wavelength range of ultra-violet, near infrared, middle infrared, or far infrared rays, microwaves, or radio waves.

[1-4. Other Configurations]

The imaging apparatus D1 may further include a band-pass filter on a side closer to an object than the encoding device C. This band-pass filter transmits only a component of a wavelength region corresponding to the object wavelength region W in reflected light coming from the photographing object O. Accordingly, components, which remain in using a spectral filter provided to the encoding device C, of wavelength regions other than the object wavelength region W can be removed. Consequently, the spectrally-separated images F which are limited to a desired object wavelength region W and exhibits high separation precision can be obtained.

[2. Signal Processing Circuit]

The signal processing circuit Pr is a circuit which processes an image signal which is outputted from the image sensor S. The signal processing circuit Pr may be incorporated in the imaging apparatus D1 or may be a constituent element of a signal processing apparatus which is electrically connected to the imaging apparatus D1 in a wired or wireless manner. The signal processing circuit Pr estimates the spectrally-separated images F which are separated for respective wavelength regions of light coming from the photographing object O, based on an image G which is acquired by the image sensor S.

The signal processing circuit Pr can be realized by a programmable logic device (PLD) such as a digital signal processor (DSP) and a field programmable gate array (FPGA) or a combination of a central processing unit (CPU)•or graphics processing unit (GPU) and a computer program, for example. Such computer program is stored in a storage medium such as a memory and the later-described arithmetic processing can be executed when the CPU executes the program. In a case where the signal processing circuit Pr is an external component of the imaging apparatus D1, a signal processing apparatus such as a personal computer (PC) which is electrically connected to the imaging apparatus D1 or a cloud server on the Internet includes the signal processing circuit Pr. In this specification, a system including such signal processing apparatus and an imaging apparatus is referred to as s "spectral system".

[3. Operation]

An operation of the imaging apparatus D1 of the present embodiment is described below.

Figure 5:
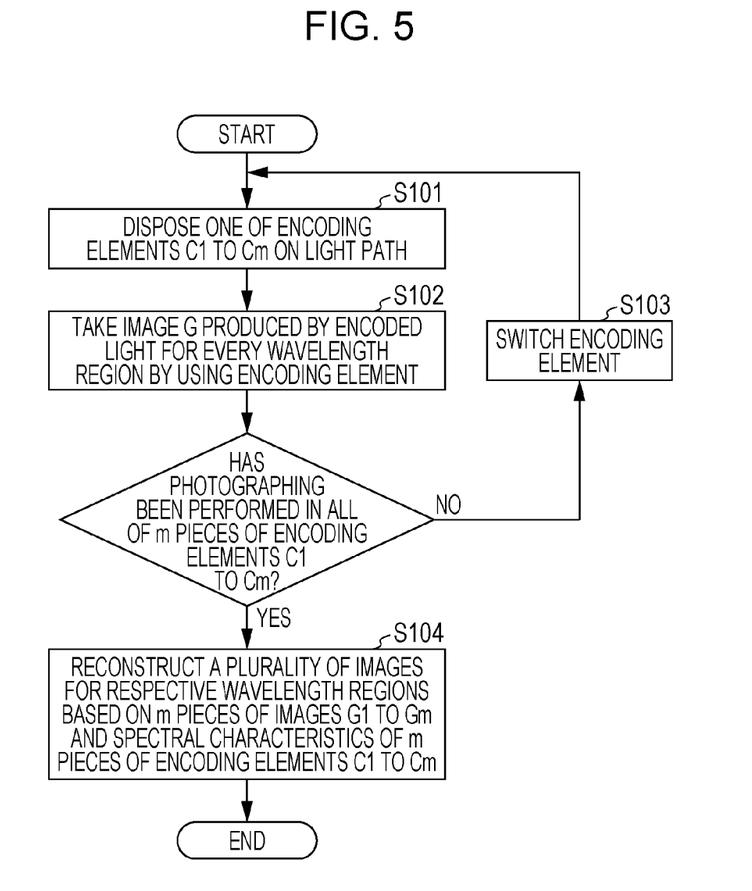
FIG. 5 is a flowchart illustrating an outline up to generation of spectrally-separated images according to the first embodiment.

FIG. 5 is a flowchart illustrating an outline of a spectroscopic method of the present embodiment. One of the encoding elements C1 to Cm is first disposed on a light path in step S101. Then, an intensity of reflected light from the photographing object O is encoded for every wavelength region in step S102 by using the encoding element which is disposed in step S101. An image G produced by the encoded light is acquired. As mentioned above, the encoding elements C1 to Cm have a transmittance a value of which is 50% or larger in at least two wavelength regions among a plurality of wavelength regions which are to be separated. Accordingly, the image G, in which beams of light of the wavelength regions which are to be separated are super-posed on each other, is acquired in step S102. Different from the conventional configuration by compressive sensing, the present embodiment does not use a spectral element such as a prism. That is, an image is not shifted in the spatial direction in accordance with a wavelength region, so that pixels corresponding to the shift amount are not sacrificed. Accordingly, high spatial resolution can be maintained even in a multiple image. The photographed image G is generated by converting information of a multiple image into an electrical signal (pixel signal) by a plurality of pixels in the image sensor S. Then, the encoding device C is rotated to switch the encoding element to another encoding element having another spectral characteristic in step S103. Steps S101 to S103 are repeated m times. Through m times of photographing, m pieces of images G1 to Gm respectively corresponding to m pieces of encoding elements C1 to Cm are acquired. In the following step S104, n pieces of images for respective wavelength regions W1 to Wn are reconstructed based on the m pieces of images G1 to Gm acquired by the image sensor S and spectral transmittances of the m pieces of encoding elements C1 to Cm. Here, the number m of times of photographing is smaller than the number n of images which are reconstructed for respective wavelength regions.

[4. Method for Reconstructing Spectral Images F1, F2, . . . , and Fm]

A method for reconstructing the multi-wavelength spectrally-separated image F based on a photographed image and a spectral transmittance characteristics of an encoding element is now described. Here, multi-wavelength represents wavelength bands the number of which is larger than that of wavelength bands of three colors (R/G/B) which are acquired by an ordinal color camera, for example. The number of wavelength bands (sometimes referred to as "the number of spectral bands" below) can be the number which is from 4 to 100 approximately, for example. The number of spectral bands may exceed 100 depending on purpose.

Data desired to be obtained is the spectrally-separated image F and the data is denoted as f. When the number of spectral bands (the number of bands) is denoted as n, data f is data obtained by integrating image data $f_1, f_2, \ldots,$ and $f_n$ of respective bands. When the number of pixels in the x direction of image data to be obtained is denoted as nx and the number of pixels in the y direction is denoted as ny, each of the image data $f_1, f_2, \ldots,$ and $f_n$ is gathering of two-dimensional data of nx×ny pixels. Accordingly, the data f is a three-dimensional data of which the number of elements is nx×ny×n. On the other hand, the photographed image G which is acquired by encoding and multiplexing by the encoding element has data g which is obtained by integrating data $g_1, g_2, \ldots,$ and $g_m$ of respective images G1, G2, . . . , and Gm which are obtained by performing photographing m times while switching encoding elements. The data g is three-dimensional data of which the number of elements is nx×ny×m. Here, the number m of times of photographing may be the number smaller than the number n of spectral bands. For example, m is equal to or smaller than one-fifth of n. M may be equal to or smaller than one-tenth of n. M may be equal to or smaller than one-thirtieth of n. Such configuration can reduce the number of times of photographing. Therefore, this configuration is advantageous for reduction of measurement time and for measurement of the photographing object O which is moving. The data g ($g_1, g_2, \ldots,$ and $g_m$) in the present embodiment can be expressed by Formula 3 below.

$$g = Hf \quad \text{[Formula 3]}$$

$$\begin{bmatrix} g_1 \\ g_2 \\ \vdots \\ g_m \end{bmatrix} = \begin{bmatrix} h_1(w_1) & h_1(w_2) & \ldots & h_1(w_n) \\ h_2(w_1) & h_2(w_2) & & h_2(w_n) \\ \vdots & & \ddots & \vdots \\ h_m(w_1) & h_m(w_2) & \ldots & h_m(w_n) \end{bmatrix} \begin{bmatrix} f_1(w_1) \\ f_2(w_2) \\ \vdots \\ f_n(w_n) \end{bmatrix}$$

In a precise sense, a vector f is a one-dimensional vector having nx×ny×n rows and one column. Further, a vector g is a one-dimensional vector having nx×ny×m rows and one column. A matrix H represents such conversion that respective components of the vector f are encoded by encoding information which differ for respective wavelength regions $w_1, w_2, \ldots,$ and $w_n$ and the encoded components are added up. An element $h_i(w_j)$ of the matrix H represents a light transmittance of an encoding element Ci (i is an integer which is from 1 to m) in a wavelength region $w_j$ (j is an integer which is from 1 to n). H denotes a matrix having nx×ny×m rows and nx×ny×n columns.

Here, it seems that f can be calculated by solving an inverse problem of Formula 3 when the vector g and the matrix H are provided. However, the number of elements nx×ny×n of the data f to be obtained is larger than the number of elements nx×ny×m of the acquired data g (m<n). Accordingly, this problem is a defectively-set problem and cannot be solved in this state. Therefore, the signal processing circuit Pr of the present embodiment utilizes redundancy of an image included in the data f and uses the method of the compressive sensing to obtain a solution. Specifically, the data f to be obtained is estimated by solving an expression of Formula 4 below.

$$f' = \mathop{\mathrm{argmin}}_{f}\{\|g - Hf\|_{l_2} + \tau\Phi(f)\} \quad \text{[Formula 4]}$$

Here, f' denotes estimated data of f. The first term in a bracket in the above formula represents a shift amount between an estimated result Hf and acquired data g, that is, a residual term. A sum of squares is a residual term in this example, but an absolute value, a square root of a sum of squares, or the like may be a residual term. The second term in the bracket is a regularized term (or a stabilized term) which will be described later. Formula 4 represents to obtain f which minimizes a sum of the first term and the second term. The signal processing circuit Pr is capable of converging solutions by recursively-iterative calculation and obtaining a final solution f'.

The first term in the bracket of Formula 4 represents calculation for obtaining a sum of squares of difference between the acquired data g and Hf obtained by system-converting f in an estimation process by the matrix H. $\Phi(f)$ of the second term denotes a limiting condition in regularization and denotes a function to which sparse information of estimation data is reflected. The function of $\Phi(f)$ is smoothing or stabilizing estimation data advantageously. A regularized term can be expressed by discrete cosine transform (DCT) of f, wavelet transform, Fourier transform, total variation (TV), or the like, for example. When total variation is used, for example, stable estimation data in which an effect of a noise of observed data g is suppressed can be acquired. A sparse characteristic of the photographing object O in a space of each regularized term differs depending on a texture of the photographing object O. A regularized term by which a texture of the photographing object O is sparser in a space of the regularized term may be selected. Alternatively, a plurality of regularized terms may be included in calculation. τ denotes a weight coefficient. As a value of τ is increased, a reduction amount of redundant data is increased (a rate of compression is increased). While, as the value of τ is decreased, convergence to a solution is lowered. The weight coefficient τ is set to a moderate value so that f converges to some extent and excessive compression does not occur.

Here, a calculation example using the compressive sensing expressed in Formula 4 is described, but calculation may be performed by using other methods. For example, other statistical methods such as maximum likelihood estimation method and Bayesian estimation method can be used. Further, the number of spectrally-separated images F is arbitrary and each wavelength region may be arbitrarily set as well.

As described above, data g is acquired by multiple times of photographing in which a plurality of encoding elements spectral transmittances of which are different from each other are used in the present embodiment. Accordingly, a spectral element, which has been conventionally acquired, such as a prism is not used. Consequently, generation of coma aberration can be suppressed and degradation of resolution caused by compressive sensing can be suppressed. Further, a relay optical system is not acquired in the configuration of the present disclosure, so that significant size reduction can be realized. In the relay optical system, a plurality of imaging planes exist on one light path (light axis), so that an apparatus easily grows in size. In the configuration of the present disclosure, the encoding device performs spatially-even intensity modulation, so that it is not necessary to dispose the encoding device on an imaging plane. Accordingly, it is not necessary to provide a plurality of imaging planes and thus, size reduction is enabled. Thus, the present embodiment can simultaneously satisfy three requests which are high resolution, multi-wavelength, and small size. Further, the present embodiment has an advantage in prolonged data acquisition because two-dimensional data only has to be held in imaging. Moreover, an image shift method in which a prism or the like is used has a possibility that saturation is generated over a wide range of a line when an object of high intensity is photographed. On the other hand, a range of saturation is limited advantageously in the present disclosure in which the image shift is not performed.

Second Embodiment

A second embodiment is different from the first embodiment in that an encoding device C is composed of a light source instead of a spectral filter. Specifically, the light intensity, for every wavelength region, in a light source which irradiates a photographing object O with light is changed at random in every photographing, in the second embodiment. This process by the encoding device C in the second embodiment is referred to as "encoding" in this specification. "Random" will be described later.

Detailed description of contents same as those of the first embodiment will be omitted below.

Figure 6:
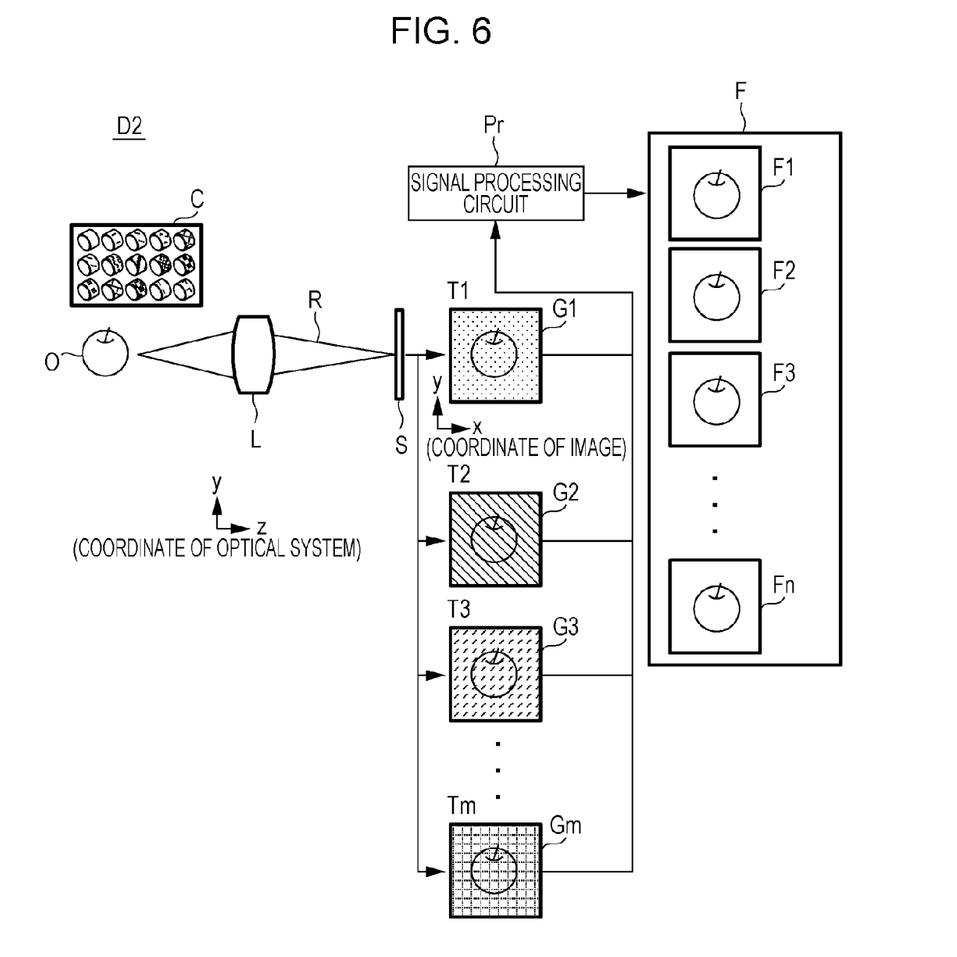
FIG. 6 is a schematic view illustrating an imaging apparatus D2 according to a second embodiment of the present disclosure.
Figure 7A:
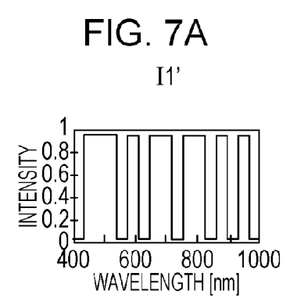
FIG. 7A illustrates an example of a wavelength characteristic of an encoding device according to the second embodiment.
Figure 7B:
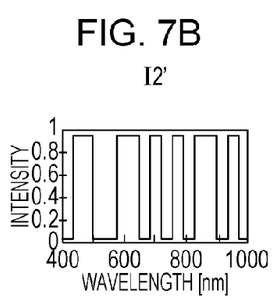
FIG. 7B illustrates an example of a wavelength characteristic of an encoding device according to the second embodiment.
Figure 7C:
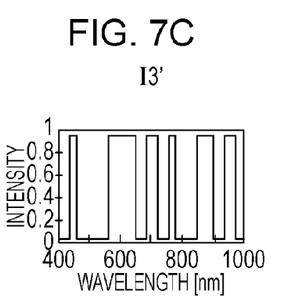
FIG. 7C illustrates an example of a wavelength characteristic of an encoding device according to the second embodiment.
Figure 7D:
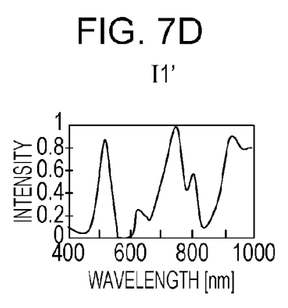
FIG. 7D illustrates another example of the wavelength characteristic of the encoding device according to the second embodiment.
Figure 7E:
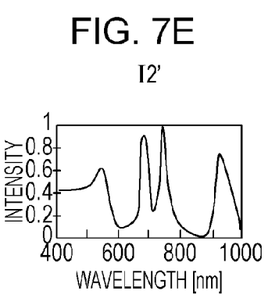
FIG. 7E illustrates another example of the wavelength characteristic of the encoding device according to the second embodiment.
Figure 7F:
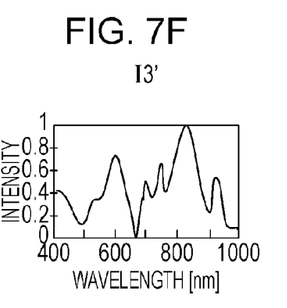
FIG. 7F illustrates another example of the wavelength characteristic of the encoding device according to the second embodiment.

FIG. 6 is a schematic view illustrating an imaging apparatus D2 of the second embodiment. The encoding device C is composed of a plurality of light sources which output beams of light which have wavelength characteristics different from each other. In other words, the encoding device C is composed of a plurality of light sources which have different wavelength distributions of output light intensities from each other. Spatial variation of wavelength distributions can be suppressed by disposing a plurality of light sources close to each other. The encoding device C is disposed close to a photographing object O to such extent that the amount of irradiated light for the photographing object O is sufficient.

The encoding device C changes combinations of light sources which are turned on and light sources which are turned off for each time of n times of photographing. Accordingly, a light source which outputs light having a wavelength characteristic which is illustrated in any one of FIGS. 7A to 7F is composed, for example. Wavelength characteristics 11', 12', and 13' are produced by varying a combination of light sources which are turned on and light sources which are turned off.

In wavelength distribution of light which is outputted by the encoding device C in one photographing, the light intensity has a value of 0.5 or larger in at least two wavelength regions among a plurality of wavelength regions W1 to Wn, in the present embodiment. Here, the light intensity is a value normalized by the maximum intensity in an object wavelength region W. A combination of light sources which are turned on and light sources which are turned off varies in every photographing. Specifically, a combination of wavelength regions in which the light intensity is 0.5 or larger or the number of wavelength regions in which the light intensity is 0.5 or larger varies. More specifically, column vectors elements of which are values of light intensities of respective photographing are mutually independent among arbitrary wavelength regions, in each of the wavelength regions W1 to Wn. Column vectors may be independent in all combinations of wavelength regions among the wavelength regions W1 to Wn. Further, column vectors may be independent in part of wavelength regions among the wavelength regions W1 to Wn. In this embodiment, a state that the column vectors of respective wavelength regions have independency is equivalent to "random".

In the present embodiment, beams of incident light incident on a photographing object are encoded by wavelength characteristics different in respective photographing by changing a combination between a light source which is turned on and a light source which is turned off among a plurality of light sources which mutually have different wavelength characteristics.

Each light source of the encoding device C may be a light source which is capable of irradiating while adjusting an amount of light instead of the light source exhibiting only binary change of turn on and turn off. The light source is composed of an LED, an LD, a laser, a fluorescent, a mercury lamp, a halogen lamp, a metal halide lamp, a xenon lamp, or the like, for example. However, the light source is not limited to these examples. Further, when a wavelength region of a terahertz wave is utilized, a light source may be composed of an ultrafast fiber laser such as a femtosecond laser.

The examples in which the encoding device C is composed of a spectral filter or a light source are described in the first and second embodiments, but the encoding device C is not limited to these. For example, the encoding device C may be realized by an optical system including a liquid crystal tunable filter, an acousto-optical element, or a digital mirror device (DMD).

What is claimed is:

1. An imaging apparatus comprising:
   an image sensor which, in operation, acquires m kinds of light from an object at different timings, m being an integer more than one, the m kinds of light each having wavelength characteristic different from each other, and outputs more than one signals each corresponding to each of the m kinds of light;
   a signal processing circuit which, in operation, processes the more than one signals to generate and output n images of the object, n being larger than m, the n images corresponding to respective wavelength regions different from each other; and
   an encoding device which, in operation, changes an intensity of incident light incident on the object or an intensity of reflected light from the object by m kinds to generate the m kinds of light at different timings, wherein:
   the encoding device includes spectral filters of which wavelength distributions of transmittances are different from each other, and
   the wavelength distribution of transmittances of each of the spectral filters is even in a spatial direction.
2. The imaging apparatus according to claim 1, wherein the encoding device includes a switch which, in operation, switches among the spectral filters to dispose one of the spectral filters on a light path of the imaging apparatus for every photographing.

3. The imaging apparatus according to claim 2, wherein the n images include a first image and a second image, and
a column vector, elements of which are respective transmittances of the spectral filters in the first wavelength region corresponding to the first image, is independent from a column vector, elements of which are respective transmittances of the spectral filters in the second wavelength region which is different from the first wavelength region and corresponds to the second image.

4. The imaging apparatus according to claim 1, wherein the encoding device includes light sources of which wavelength distributions of light intensities are different from each other, and
them kinds of light are obtained by changing a combination of a light source which is turned on and a light source which is turned off among the light sources.

5. The imaging apparatus according to claim 4, wherein the n images include a first image and a second image, and
a column vector, elements of which are values of intensities of the m kinds of light in a first wavelength region corresponding to the first image, is independent from a column vector, elements of which are values of intensities of the m kinds of light in a second wavelength region which is different from the first wavelength region and corresponds to the second image.

6. The imaging apparatus according to claim 1, wherein m has a value which is one-fifth of n or smaller.

7. The imaging apparatus according to claim 1, wherein the imaging apparatus is configured such that an autocorrelation function y(i,j) which is defined by a following formula and expresses a correlation value between a first wavelength characteristic in a wavelength region of an N-th image, among the n images, of an M-th kind of light among the m kinds of light and a second wavelength characteristic in a wavelength region of an N+j-th image, among the n images, of an M+i-th kind of light among the m kinds of light, by expressing i and j as variables has a local maximum value only on y(0,0);

$$y(i, j) = \sum_{M=1}^{m} \sum_{N=1}^{n} x(M, N) \cdot x(M + i, N + j)$$

where, x(M,N) denotes the first wavelength characteristic, x(M+i,N+j) denotes the second wavelength characteristic, wherein i is an integer from −(m−1) to (m−1), both inclusive, and j is an integer from −(n−1) to (n−1), both inclusive.

8. The imaging apparatus according to claim 1, wherein m has a value of one-tenth of n or smaller.

9. An imaging apparatus comprising:
an image sensor which, in operation, acquires m kinds of light from an object at different timings, m being an integer more than one, the m kinds of light each having wavelength characteristic different from each other, and outputs more than one signals each corresponding to each of the m kinds of light; and
a signal processing circuit which, in operation, processes the more than one signals to generate and output n images of the object, n being larger than m, the n images corresponding to respective wavelength regions different from each other, wherein:
the wavelength characteristic has one or more local maximum values of a transmittance in each of a first wavelength region and a second wavelength region, the first wavelength region and the second wavelength region being different from each other, and
each of the one or more local maximum values in each of the first wavelength region and the second wavelength region is 0.5 or larger where the wavelength characteristic is normalized so that a maximum value of the transmittance is 1 and a minimum value is 0.

10. An imaging apparatus comprising:
an image sensor which, in operation, acquires m kinds of light from an object at different timings, m being an integer more than one, the m kinds of light each having wavelength characteristic different from each other, and outputs more than one signals each corresponding to each of the m kinds of light; and
a signal processing circuit which, in operation, processes the more than one signals to generate and output n images of the object, n being larger than m, the n images corresponding to respective wavelength regions different from each other, wherein:
the image sensor includes Cn kinds of color filters, and m, n, and Cn satisfy a relation of m×Cn<n.

11. The imaging apparatus according to claim 10, further comprising:
an encoding device which, in operation, changes an intensity of incident light incident on the object or an intensity of reflected light from the object by m kinds to generate the m kinds of light,
wherein the encoding device includes:
spectral filters of which wavelength distributions of transmittances are different from each other; and
a switch which, in operation, switches among the spectral filters to dispose one of the spectral filters on a light path of the imaging apparatus for every photographing.

12. The imaging apparatus according to claim 11, wherein:
the n images include a first image and a second image, and
a column vector, elements of which are respective transmittances of the spectral filters in the first wavelength region corresponding to the first image, is independent from a column vector, elements of which are respective transmittances of the spectral filters in the second wavelength region which is different from the first wavelength region and corresponds to the second image.

13. The imaging apparatus according to claim 10, further comprising:
an encoding device which, in operation, changes an intensity of incident light incident on the object or an intensity of reflected light from the object by m kinds to generate the m kinds of light, wherein:
the encoding device includes light sources of which wavelength distributions of light intensities are different from each other, and
the m kinds of light are obtained by changing a combination of a light source which is turned on and a light source which is turned off among the light sources.

14. The imaging apparatus according to claim 13, wherein:
the n images include a first image and a second image, and
a column vector, elements of which are values of intensities of the m kinds of light in a first wavelength region corresponding to the first image, is independent from a column vector, elements of which are values of intensities of the m kinds of light in a second wavelength region which is different from the first wavelength region and corresponds to the second image.

15. The imaging apparatus according to claim 10, wherein m has a value which is one-fifth of n or smaller.

16. The imaging apparatus according to claim 10, wherein the imaging apparatus is configured such that an auto-correlation function y(i,j) which is defined by a following formula and expresses a correlation value between a first wavelength characteristic in a wavelength region of an N-th image, among the n images, of an M-th kind of light among the m kinds of light and a second wavelength characteristic in a wavelength region of an N+j-th image, among the n images, of an M+i-th kind of light among the m kinds of light, by expressing i and j as variables has a local maximum value only on y(0,0);

$$y(i, j) = \sum_{M=1}^{m} \sum_{N=1}^{n} x(M, N) \cdot x(M + i, N + j)$$

where, x(M,N) denotes the first wavelength characteristic, x(M+i,N+j) denotes the second wavelength characteristic, wherein i is an integer from −(m−1) to (m−1), both inclusive, and j is an integer from −(n−1) to (n−1), both inclusive.

17. The imaging apparatus according to claim 10, wherein m has a value of one-tenth of n or smaller.

\* \* \* \* \*